(12) United States Patent
Burdeniuc et al.

(10) Patent No.: US 8,530,534 B2
(45) Date of Patent: *Sep. 10, 2013

(54) TRIMERIZATION CATALYSTS FROM STERICALLY HINDERED SALTS

(75) Inventors: Juan Jesus Burdeniuc, Colmar, PA (US); Torsten Panitzsch, Henstedt-Ulzburg (DE); John Elton Dewhurst, Macungie, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 989 days.

This patent is subject to a terminal disclaimer.

(21) Appl. No.: 11/418,287

(22) Filed: May 4, 2006

(65) Prior Publication Data

US 2007/0259983 A1 Nov. 8, 2007

(51) Int. Cl.
*C08G 18/22* (2006.01)

(52) U.S. Cl.
USPC ........... 521/124; 521/125; 521/128; 521/129; 521/130; 521/170

(58) Field of Classification Search
USPC ................. 521/124, 125, 170, 128, 129, 130
See application file for complete search history.

(56) References Cited

U.S. PATENT DOCUMENTS

| | | | |
|---|---|---|---|
| 3,686,225 A * | 8/1972 | Pedersen | 549/308 |
| 3,892,687 A | 7/1975 | Bechara et al. | |
| 3,940,517 A | 2/1976 | DeLeon | |
| 3,954,684 A | 5/1976 | Farrissey, Jr. et al. | |
| 3,988,267 A | 10/1976 | Bechara et al. | |
| 3,989,651 A | 11/1976 | Lockwood et al. | |
| 3,993,652 A | 11/1976 | Bechara et al. | |
| 4,003,859 A * | 1/1977 | Reymore et al. | 521/114 |
| 4,026,840 A | 5/1977 | Bechara et al. | |
| 4,148,980 A | 4/1979 | Narayan | |
| 4,393,148 A | 7/1983 | Kamens | |
| 4,454,317 A | 6/1984 | Disteldorf et al. | |
| 4,460,714 A | 7/1984 | Kamens | |
| 4,489,177 A * | 12/1984 | O'Connor et al. | 521/164 |
| 4,503,226 A | 3/1985 | Tang et al. | |
| 4,698,398 A | 10/1987 | Kordomenos et al. | |
| 4,771,025 A | 9/1988 | Eling et al. | |
| 4,996,241 A | 2/1991 | Eling et al. | |
| 5,321,050 A | 6/1994 | Morimoto et al. | |
| 5,691,440 A * | 11/1997 | Katz et al. | 528/52 |
| 5,902,835 A | 5/1999 | Meier et al. | |
| 6,590,057 B1 | 7/2003 | Brecht et al. | |
| 6,846,850 B2 * | 1/2005 | Schilling et al. | 521/174 |

FOREIGN PATENT DOCUMENTS

| | | |
|---|---|---|
| CN | 1010025 B | 10/1990 |
| EP | 1 375 546 A1 | 1/2004 |
| EP | 1 443 065 A1 | 8/2004 |
| GB | 1258357 A | 12/1971 |
| JP | S62156118 A | 7/1987 |
| JP | H06200069 A | 7/1994 |
| JP | 07-097429 A | 4/1995 |
| JP | H10139697 A | 5/1998 |
| WO | 03/099875 A2 | 12/2003 |
| WO | 2005/080464 A1 | 9/2005 |

* cited by examiner

*Primary Examiner* — John Cooney
(74) *Attorney, Agent, or Firm* — Michael K. Boyer

(57) ABSTRACT

The present invention provides trimerization catalyst compositions having a sterically hindered carboxylate salt and methods to produce a polyisocyanurate/-polyurethane foam using such trimerization catalyst compositions.

27 Claims, 10 Drawing Sheets

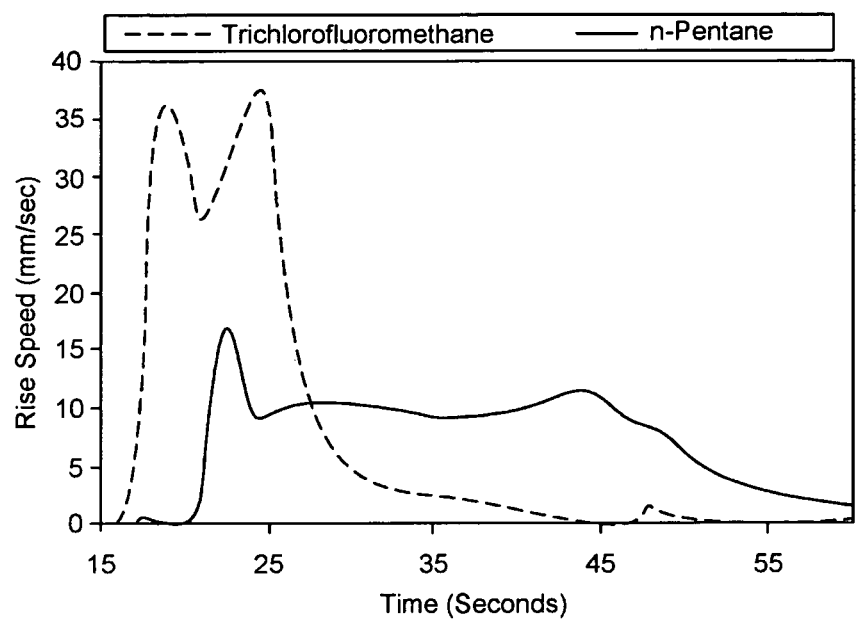

TRIMERIZATION CATALYSTS FROM STERICALLY HINDERED SALTS

BACKGROUND OF THE INVENTION

The present invention relates generally to catalyst systems, compositions comprising catalyst systems, polyisocyanurate/polyurethane (PIR/PUR) foam formulations, and methods of making PIR/PUR foams.

Typically, polyisocyanurate/polyurethane (PIR/PUR) foams are made by reacting a polyol and a polyisocyanate in the presence of a catalyst. Additional additives can be present. PIR/PUR foam products have excellent thermal stability and flame resistance. Isocyanurates retain their strength to temperatures of about 160° C. and are resistant to most organic solvents, acids, alkali, ultraviolet light, and humidity.

Certain carboxylate salts, such as, for example, certain alkali metal carboxylate salts, have been used as catalysts in the production of PIR/PUR foams. The use of commercially available alkali metal carboxylate salt catalysts, however, often leads to undesirable foam processing problems which are particularly significant in continuous foam operations. A distinctive "step" is observed, which is normally associated with the onset of the trimerization process, when measuring the rise speed profile of the foam, or by plotting the foam height versus time. This trimerization "step" causes a significant change in the speed of the foam rise; in essence, the foam expands at two different rates during the foaming process. In a continuous polyisocyanurate/polyurethane foam lamination operation, it is difficult to adjust the speed of the production unit to match the change in the speed of the foam rise. The result can be foam overpacking or foam back flow. This undesirable rapid rise in foam height is particularly troublesome when processing polyisocyanurate/polyurethane formulations at a high Isocyanate Index. That is, the change in the rate of foam rise is much more dramatic at a higher Isocyanate Index. Consequently, it is a technical challenge to produce desirable low flammability foam products, with a high isocyanate index, when using conventional alkali metal carboxylate salt catalysts.

As compared to alkali metal carboxylate salt catalysts, commercially available polyisocyanurate trimerization catalysts based on hydroxyalkylammonium carboxylate salts show different processability in continuous operations. They provide a smoother rate of rise profile and have a less significant trimerization "step." That is, the rate of foam rise is more consistent, even at a higher Isocyanate Index. However, hydroxyalkylammonium carboxylate salt catalysts can be unstable at temperatures above about 100° C., decomposing into volatile amine by-products. This decomposition process causes the release of volatile amines and can impart an undesirable amine odor to finished foam products. The polymerization reactions that produce PIR/PUR foam are highly exothermic, often leading to foam processing temperatures in excess of 100° C. Hence, hydroxyalkylammonium carboxylate salt catalysts can provide more predictable foam processability, but sometimes at the expense of a foam product with an undesirable amine odor.

Thus, there exists a need for a catalyst composition and a foam formulation that can offer a smooth rise profile—foam height versus time—for producing PIR/PUR foams in continuous operations. Further, there exists a need for a catalyst composition that performs well in foam formulations with a high Isocyanate Index. At the same time, such catalyst composition should provide equivalent or faster surface cure when compared to commercially available catalyst systems, such that the foam products made with the catalyst composition can have reduced surface friability and enhanced surface adherence during the manufacture of finished products such as laminated foam panels. Optionally, depending upon the selection of the catalyst components, the catalyst composition can be thermally stable at the temperatures which PIR/PUR foams normally encounter during manufacturing, and produce foams that are substantially free of volatile amines and/or amine odors.

BRIEF SUMMARY OF THE INVENTION

The present invention provides a novel catalyst composition for producing a PIR/PUR foam comprising at least one sterically hindered carboxylate salt having the formula

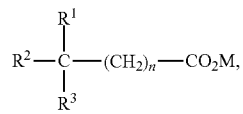

wherein:
$R^1$, $R^2$, and $R^3$ are selected independently from a $C_1$-$C_{18}$ alkyl, alkenyl, aryl, or aralkyl, any of which are substituted or unsubstituted;
n is an integer from 0 to 10, inclusive; and
M is an alkali metal ion or a quaternary ammonium ion.

In another aspect, the present invention discloses a composition comprising the contact product of at least one active hydrogen-containing compound, a catalyst composition comprising at least one sterically hindered carboxylate salt, and at least one blowing agent, with the proviso that the at least one blowing agent is not a chlorofluorocarbon (CFC). Further, the present Invention also discloses a composition comprising the contact product of at least one polyisocyanate, a catalyst composition comprising at least one sterically hindered carboxylate salt, and at least one blowing agent, with the proviso that the at least one blowing agent is not a chlorofluorocarbon (CFC). Due to the discovery that chlorofluorocarbons (CFCs) can deplete ozone in the stratosphere, this class of blowing agents is not desirable for use in the present invention.

The present invention also provides a method for preparing polyisocyanurate/polyurethane (PIR/PUR) foam. This method comprises contacting at least one polyisocyanate with at least one active hydrogen-containing compound, in the presence of at least one blowing agent, with the proviso that the at least one blowing agent is not a CFC, and an effective amount of a catalyst composition comprising at least one sterically hindered carboxylate salt.

The catalyst composition of the present invention offers a substantially consistent foam height rise versus time—even at a high Isocyanate Index—and can provide an equivalent or faster surface cure during the preparation of PIR/PUR foams. In another aspect of the present invention, the catalyst composition can be thermally stable at standard foam processing temperatures, producing PIR/PUR foams which are substantially free of volatile amines and/or amine odors.

DEFINITIONS

The following definitions are provided in order to aid those skilled in the art in understanding the detailed description of the present invention.
PIR—Polyisocyanurate.
PUR—Polyurethane.
Isocyanate Index—The actual amount of polyisocyanate used divided by the theoretically required stoichiometric amount of polyisocyanate required to react with all the active hydrogen in the reaction mixture, multiplied by 100. Also known as (Eq NCO/Eq of active hydrogen)×100.

pphp—parts by weight per hundred weight parts polyol.

DABCO® K15 catalyst from Air Products and Chemicals, Inc. (APCI) is a 70% solution of an alkali metal carboxylate salt, potassium 2-ethylhexanoate (also known potassium octoate), in diethylene glycol.

DABCO TMR® catalyst from APCI is a 75% solution of 2-hydroxypropyltrimethylammonium octoate in ethylene glycol Polycat® 5 catalyst from APCI is a urethane catalyst, known chemically as pentamethyldiethylenetriamine.

BRIEF DESCRIPTION OF SEVERAL VIEWS OF THE DRAWINGS

FIG. 10 presents a plot of the rate of foam rise speed versus time for foam formulations using trichlorofluoromethane and n-pentane blowing agents.

DETAILED DESCRIPTION OF THE INVENTION

Figure 1:
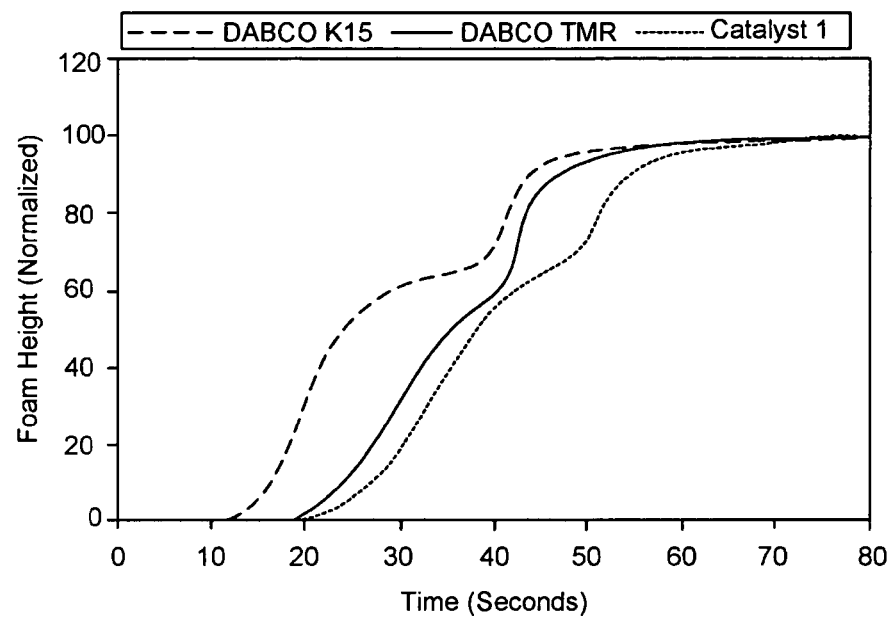
FIG. 1 presents a plot of the normalized foam height versus time for sterically hindered carboxylate salt catalyst 1, the DABCO® K15 catalyst, and the DABCO TMR® catalyst, at an Isocyanate Index of about 500.

The present invention is directed to a novel catalyst composition comprising at least one sterically hindered carboxylate salt. This novel catalyst system can be used as a polyisocyanate trimerization catalyst system for producing polyisocyanurate/-polyurethane (PIR/PUR) foams. Further, the present invention also is directed to novel compositions comprising the contact product of at least one active hydrogen-containing compound, at least one blowing agent, and a catalyst composition comprising at least one sterically hindered carboxylate salt. Additionally, the present invention is directed to novel compositions comprising the contact product of at least one polyisocyanate, at least one blowing agent, and a catalyst composition comprising at least one sterically hindered carboxylate salt. These novel compositions can be used together with additional components to produce PIR/PUR foams.

Also, the present invention provides a method for preparing a PIR/PUR foam which comprises contacting at least one polyisocyanate with at least one active hydrogen-containing compound in the presence of at least one blowing agent and an effective amount of a catalyst composition comprising at least one sterically hindered carboxylate salt. Additionally, rigid PIR/PUR foams can be produced with the novel catalyst system and novel compositions of the present invention by several methods known within the art.

A catalyst composition comprising at least one sterically hindered carboxylate salt can be used to trimerize isocyanates to produce isocyanurates. Generally, any amount of the at least one sterically hindered carboxylate salt can be used in the compositions of the present invention. As used in practice, catalyst systems for PIR/PUR foams typically include solutions of carboxylate salts in, for example, a diluent such as ethylene glycol. When a quantity by weight of the catalyst composition of the present invention is discussed, the quantity will exclude the effect of the diluent, unless stated otherwise. As an example, if 10 grams of a 50% solution of potassium pivalate catalyst in ethylene glycol were used in a given application, the amount of the potassium pivalate salt catalyst would equal 5 grams. Hence, 5 grams of that catalyst component would be used in calculating any weight ratios of that component in relation to, for example, the amount of active hydrogen-containing compound or the amount of polyol.

Applicants disclose several types of ranges in the present invention. These include, but are not limited to, a range of temperatures; a range of number of atoms; a range of foam density; a range of Isocyanate Index; and a range of pphp for the blowing agent, water, surfactant, flame retardant, urethane catalyst, and catalyst composition comprising at least one sterically hindered carboxylate salt. When Applicants disclose or claim a range of any type, Applicants' intent is to disclose or claim individually each possible number that such a range could reasonably encompass, as well as any sub-ranges and combinations of sub-ranges encompassed therein. For example, when the Applicants disclose or claim a chemical moiety having a certain number of carbon atoms, Applicants' intent is to disclose or claim individually every possible number that such a range could encompass, consistent with the disclosure herein. For example, the disclosure that "$R^1$" can be an alkyl group having up to 18 carbon atoms, or in alternative language a $C_1$ to $C_{18}$ alkyl group, as used herein, refers to a "$R^1$" group that can be selected independently from an alkyl group having 1, 2, 3, 4, 5, 6, 7, 8, 9, 10, 11, 12, 13, 14, 15, 16, 17, or 18 carbon atoms, as well as any range between these two numbers (for example, a $C_1$ to $C_8$ alkyl group), and also including any combination of ranges between these two numbers (for example, a $C_3$ to $C_5$ and $C_7$ to $C_{10}$ alkyl group). Likewise, this applies to all other carbon ranges disclosed herein, for example, $C_1$ to $C_{18}$ ranges for $R^2$ and $R^3$; alkoxy groups having up to 10 carbon atoms; etc.

Similarly, another representative example follows for the parts by weight of the catalyst composition comprising at least one sterically hindered carboxylate salt per hundred weight parts of the at least one active hydrogen-containing compound in a composition or a foam formulation. If the at least one active hydrogen-containing compound is an at least one polyol, the parts by weight per hundred weight parts polyol is abbreviated as pphp. Hence, by the disclosure that the catalyst composition comprising at least one sterically hindered carboxylate salt is present in an amount from about 0.05 to about 10 pphp, for example, Applicants intend to recite that the pphp can be selected from about 0.05, about 0.06, about 0.07, about 0.08, about 0.09, about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10. Likewise, all other ranges disclosed herein should be interpreted in a manner similar to these two examples.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants may be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants may be unaware of at the time of the filing of the application.

Although not required, another aspect of the present invention provides a thermally stable catalyst system. When used to describe this feature, a compound is defined as thermally stable at a given temperature when it does not decompose or release volatile amines and/or related amine odors at the given temperature. A hydroxyalkylammonium salt catalyst, such as the DABCO TMR® catalyst, can become unstable when the PIR/PUR foam temperature reaches above about 100° C. during foam processing. At these elevated temperatures, due to the nature of the quaternary amine salt, the DABCO TMR® catalyst can release volatile amine components. Catalyst compositions of the present invention which are based on quaternary ammonium salts are thermally stable if they do not have either functional groups (e.g., hydroxyl) or hydrogen on the carbon atom at the β-position relative to the quaternary nitrogen.

Thus, sterically hindered carboxylate salts with alkali metal ions, for example, lithium, sodium, potassium, and rubidium, are thermally stable catalyst compositions within the scope of the present invention. Quaternary ammonium salts with thermal stability include, but are not limited to, tetramethylammonium pivalate, tetraethylammonium pivalate, tetrapropylammonium pivalate, tetrabutylammonium pivalate, tetramethylammonium triethylacetate, tetraethylammonium triethylacetate, tetrapropylammonium triethylacetate, tetrabutylammonium triethylacetate, tetramethylammonium neoheptanoate, tetraethylammonium neoheptanoate, tetrapropylammonium neoheptanoate, tetrabutylammonium neoheptanoate, tetramethylammonium neooctanoate, tetraethylammonium neooctanoate, tetrapropylammonium neooctanoate, tetrabutylammonium neooctanoate, tetramethylammonium neodecanoate, tetraethylammonium neodecanoate, tetrapropylammonium neodecanoate, tetrabutylammonium neodecanoate, and the like. Such salts can be employed individually or in any combination thereof.

In one aspect of the present invention, the catalyst composition comprising at least one sterically hindered carboxylate salt has thermal stability up to about 150° C., wherein no or substantially no volatile amine compounds are emitted. Typical foam temperatures resulting from the exothermic reactions during the processing of PIR/PUR foam can be in the range of about 80° C. to about 150° C. In a further aspect, the catalyst system of the present invention has thermal stability up to about 175° C., about 200° C., about 220° C., about 240° C., or about 250° C.

The sterically hindered carboxylate salts of the catalyst composition of the present invention can be produced, for example, by the reaction of an organic acid with an alkali hydroxide. In another aspect of the present invention, the sterically hindered carboxylate salt can be produced by the reaction of an organic acid with a tetraalkylammonium hydroxide, or a reaction of an organic acid with a tertiary amine followed by a reaction with an epoxy compound. The latter reaction with an epoxy can lead to a hydroxyalkyl quaternary compound (for example, 2-hydroxypropyltrimethyl-ammonium) which is unstable at elevated temperatures. However, such reaction products can be employed in the present invention.

Although not a requirement of the present invention, the catalyst system or novel compositions of the present invention can further comprise other catalytic materials or carboxylate salts in any amount. These can include, but are not limited to, alkali metal α,β-unsaturated carboxylate salts, alkaline earth metal α,β-unsaturated carboxylate salts, quaternary ammonium α,β-unsaturated carboxylate salts, alkali metal carboxylate salts, alkaline earth metal carboxylate salts, quaternary ammonium carboxylate salts, or any combination thereof. Illustrative examples of α,β-unsaturated carboxylate salts include, but are not limited to, potassium acrylate, tetramethylammonium acrylate, tetraethylammonium acrylate, tetrapropylammonium acrylate, tetrabutylammonium acrylate, potassium methacrylate, tetramethylammonium methacrylate, tetraethylammonium methacrylate, tetrapropylammonium methacrylate, tetrabutylammonium methacrylate, mono-potassium fumarate, bis-potassium fumarate, mono-tetramethylammonium fumarate, bis-tetramethylammonium fumarate, potassium tetramethylammonium fumarate, mono-tetraethylammonium fumarate, bis-tetraethylammonium fumarate, potassium tetraethylammonium fumarate, mono-tetrapropylammonium fumarate, bis-tetrapropylammonium fumarate, potassium tetrapropylammonium fumarate, mono-tetrabutylammonium fumarate, bis-tetrabutylammonium fumarate, potassium tetrabutylammonium fumarate, mono-potassium maleate, bis-potassium maleate, mono-tetramethylammonium maleate, bis-tetramethylammonium maleate, potassium tetramethylammonium maleate, mono-tetraethylammonium maleate, bis-tetraethylammonium maleate, potassium tetraethylammonium maleate, mono-tetrapropylammonium maleate, bis-tetrapropylammonium maleate, potassium tetrapropylammonium maleate, mono-tetrabutylammonium maleate, bis-tetrabutylammonium maleate, potassium tetrabutylammonium maleate, trimethyl(2-hydroxyethyl)ammonium acrylate, triethyl(2-hydroxyethyl)ammonium acrylate, tripropyl(2-hydroxyethyl)ammonium acrylate, tributyl(2-hydroxyethyl)ammonium acrylate, dimethylbenzyl(2-hydroxypropyl)ammonium acrylate, dimethylbenzyl(2-hydroxyethyl)ammonium acrylate, trimethyl(2-hydroxyethyl)ammonium methacrylate, triethyl(2-hydroxyethyl)ammonium methacrylate, tripropyl(2-hydroxyethyl)ammonium methacrylate, tributyl(2-hydroxyethyl)ammonium methacrylate, dimethylbenzyl(2-hydroxypropyl)ammonium methacrylate, dimethylbenzyl(2-hydroxyethyl)ammonium methacrylate, bis-(trimethyl(2-hydroxyethyl)ammonium)maleate, bis-(triethyl(2-hydroxyethyl)ammonium)maleate, bis-(tripropyl(2-hydroxyethyl)ammonium)maleate, bis-(tributyl(2-hydroxyethyl)ammonium)maleate, bis-(dimethylbenzyl (2-hydroxypropyl)ammonium) maleate, bis-(dimethylbenzyl(2-hydroxyethyl) ammonium)maleate, bis-(trimethyl(2-hydroxyethyl)ammonium)fumarate, bis-(triethyl(2-hydroxyethyl)ammonium)fumarate, bis-(tripropyl(2-hydroxyethyl) ammonium)fumarate, bis-(tributyl(2-hydroxyethyl)ammonium)fumarate, bis-(dimethylbenzyl(2-hydroxypropyl)ammonium)fumarate, bis-(dimethylbenzyl (2-hydroxyethyl) ammonium)fumarate, and the like, or any combination thereof.

Illustrative examples of alkali metal, alkaline earth metal, and quaternary ammonium carboxylate salts include, but are not limited to, potassium formate, potassium acetate, potassium propionate, potassium butanoate, potassium pentanoate, potassium hexanoate, potassium heptanoate, potassium octoate, potassium 2-ethylhexanoate, potassium decanoate, potassium butyrate, potassium isobutyrate, potassium nonante, potassium stearate, sodium octoate, lithium stearate, sodium caprioate, lithium octoate, 2-hydroxypropyltrimethylammonium octoate solution, and the like, or any combination thereof.

It is also within the scope of the catalyst composition of this invention to include mixtures or combinations of more that one sterically hindered carboxylate salt. Additionally, the catalyst system or the novel compositions of the present invention can also further comprise at least one urethane catalyst.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions or foam formulations described herein. Combining additional catalyst components can be done by any method known to one of skill in the art. For example, in one aspect of the present invention, catalyst compositions can be prepared by combining or contacting the at least one sterically hindered carboxylate salt with an optional alkali metal carboxylate salt. This typically occurs in solution form. In another aspect, the catalyst composition can be prepared by first mixing the respective carboxylic acids, followed by neutralization to form the corresponding salts.

While compositions and methods are described in terms of "comprising" various components or steps, the compositions and methods can also "consist essentially of" or "consist of" the various components or steps.

Sterically Hindered Carboxylate Salts

Catalyst compositions of the present invention comprise at least one sterically hindered carboxylate salt. The at least one sterically hindered carboxylate salt is particularly useful for producing PIR/PUR foams. Further, catalyst compositions within the scope of the present invention can comprise at least one sterically hindered carboxylate salt having the formula

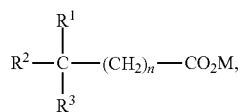

wherein:
$R^1$, $R^2$, and $R^3$ are selected independently from a $C_1$-$C_{18}$ alkyl, alkenyl, aryl, or aralkyl, any of which are substituted or unsubstituted;
n is an integer from 0 to 10, inclusive; and
M is an alkali metal ion or a quaternary ammonium ion.

Unless otherwise specified, alkyl and alkenyl groups described herein are intended to include all structural isomers, linear or branched, of a given structure; for example, all enantiomers and all diasteriomers are included within this definition. As an example, unless otherwise specified, the term propyl is meant to include n-propyl and iso-propyl, while the term butyl is meant to include n-butyl, iso-butyl, t-butyl, sec-butyl, and so forth. Similarly, substituted alkyl, alkenyl, aryl, and aralkyl groups described herein are intended to include substituted analogs of a given structure. For example, the substituents on alkyl, alkenyl, aryl, and aralkyl groups can include, but are not limited to, halides; hydroxyl groups; amino groups; alkoxy, alkylamino, or dialkylamino groups having up to 10 carbon atoms; or combinations thereof.

Non-limiting examples of alkyl groups which can be present in the at least one sterically hindered carboxylate salt include, but are not limited to, methyl, ethyl, propyl, butyl, pentyl, hexyl, heptyl, octyl, nonyl, or decyl, and the like. Examples of alkenyl groups within the scope of the present invention include, but are not limited to, ethenyl, propenyl, butenyl, pentenyl, hexenyl, heptenyl, octenyl, nonenyl, decenyl, and the like. Aryl and aralkyl (aralkyl is defined as an aryl-substituted alkyl or arylalkyl) groups include phenyl, alkyl-substituted phenyl, naphthyl, alkyl-substituted naphthyl, and the like. For example, non-limiting examples of aryl and aralkyl groups useful in the present invention include, but are not limited to, phenyl, tolyl, benzyl, dimethylphenyl, trimethylphenyl, phenylethyl, phenylpropyl, phenylbutyl, propyl-2-phenylethyl, and the like.

In one aspect of the present invention, $R^1$, $R^2$, and $R^3$ are selected independently from methyl, ethyl, propyl, butyl, pentyl, hexyl, heptyl, octyl, phenyl, tolyl, and benzyl. In another aspect, $R^1$, $R^2$, and $R^3$ are selected independently from methyl, ethyl, propyl, and butyl. In accordance with a further aspect of the present invention, $R^1$, $R^2$, and $R^3$ of the sterically hindered structure are not hydrogen atoms.

In another aspect, M is an ion of lithium, potassium, sodium, or rubidium. In yet another aspect, M is a potassium ion. Quaternary ammonium ions useful in the present invention include, but are not limited to, tetramethylammonium, tetraethylammonium, tetrapropylammonium, tetrabutylammonium, dimethyldiallylammonium, trimethyl-(2-hydroxypropyl) ammonium, triethyl(2-hydroxypropyl)ammonium, tripropyl(2-hydroxy-propyl)ammonium, tributyl(2-hydroxypropyl)ammonium, trimethyl(2-hydroxyethyl)-ammonium, triethyl(2-hydroxyethyl)ammonium, tripropyl(2-hydroxyethyl)ammonium, tributyl(2-hydroxyethyl) ammonium, dimethylbenzyl(2-hydroxypropyl)ammonium, dimethylbenzyl(2-hydroxyethyl)ammonium, and the like, or any combination thereof. In a further aspect of the present invention, M is a tetramethylammonium ion or a dimethyldiallylammonium ion.

The integer n in the above formula can range from 0 to 10, inclusive, in one aspect of the present invention. In another aspect, n can range from 0 to 5, inclusive. In still another aspect, n equals zero. As an example, when $R^1$, $R^2$, and $R^3$ are each a methyl group, M is a potassium ion, and n equals zero, the sterically hindered carboxylate salt is potassium pivalate.

In another aspect of the present invention, the at least one sterically hindered carboxylate salt is an alkali metal carboxylate salt or a quaternary ammonium carboxylate salt, or a combination thereof. In yet another aspect, the sterically hindered carboxylate salts and acids within the scope of this invention comprise at least one quaternary carbon moiety. That is, as a minimum, one carbon atom within the carboxylate salt or carboxylic acid structures and materials described herein is a quaternary carbon. As used herein, a quaternary carbon is defined as a carbon that is bonded to four other carbon atoms. This quaternary carbon moiety can be further illustrated, for example, by the carboxylate salt and acid species that follow.

Suitable sterically hindered carboxylate salts of the present invention include, but are not limited to, potassium pivalate, tetramethylammonium pivalate, 2-hydroxyl-propyltrimethylammonium pivalate, 2-hydroxylpropyltriethylammonium pivalate, tetraethylammonium pivalate, tetrapropylammonium pivalate, tetrabutylammonium pivalate, dimethyldiallylammonium pivalate, potassium triethylacetate, tetramethylammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, potassium neoheptanoate, tetramethylammonium neoheptanoate, 2-hydroxylpropyltrimethyl-ammonium neoheptanoate, 2-hydroxylpropyltriethylammonium neoheptanoate, tetraethylammonium neoheptanoate, tetrapropylammonium neoheptanoate, tetrabutyl-ammonium neoheptanoate, potassium neooctanoate, tetramethylammonium neooctanoate, 2-hydroxylpropyltrimethylammonium neooctanoate, 2-hydroxyl-propyltriethylammonium neooctanoate, tetraethylammonium neooctanoate, tetrapropyl-ammonium neooctanoate, tetrabutylammonium neooctanoate, potassium neodecanoate, tetramethylammonium neodecanoate, 2-hydroxylpropyltrimethylammonium neodecanoate, 2-hydroxylpropyltriethylammonium neodecanoate, tetraethylammonium neodecanoate, tetrapropylammonium neodecanoate, tetrabutylammonium neodecanoate, and the like, or any combination thereof.

In another aspect of the present invention, the at least one sterically hindered carboxylate salt is a tetraalkylammonium carboxylate salt. In yet another aspect, the at least one sterically hindered carboxylate is tetramethylammonium pivalate, dimethyldiallylammonium pivalate, potassium pivalate, potassium neoheptanoate, potassium neodecanoate, or a combination thereof. In still another aspect, the at least one sterically hindered carboxylate salt is potassium pivalate.

In a further aspect, the at least one sterically hindered carboxylate salt is a salt of a carboxylic acid, for example, an alkali metal salt or quaternary ammonium salt of a sterically hindered carboxylic acid. Suitable carboxylic acids within the scope of the present invention include, but are not limited to, pivalic, triethylacetic, neohexanoic, neoheptanoic, neooctanoic, neodecanoic, neoundecanoic, neododecanoic, and the like, mixtures thereof, or any combination thereof.

Polyisocyanates

Polyisocyanates that are useful in the PIR/PUR foam formation process include, but are not limited to, hexamethylene diisocyanate, isophorone diisocyanate, phenylene diisocyante, toluene diisocyanate (TDI), diphenyl methane diisocyanate isomers (MDI), hydrated MDI and 1,5-naphthalene diisocyanate. For example, 2,4-TDI, 2,6-TDI, and mixtures thereof, can be readily employed in the present invention. Other suitable mixtures of diisocyanates include, but are not limited to, those known in the art as crude MDI, or PAPI, which contain 4,4'-diphenylmethane diisocyanate along with other isomeric and analogous higher polyisocyanates. In another aspect of this invention, prepolymers of polyisocyanates comprising a partially pre-reacted mixture of polyisocyanates and polyether or polyester polyol are suitable. In still another aspect, the polyisocyanate comprises MDI, or consists essentially of MDI or mixtures of MDI's.

The catalyst system, compositions, and methods of producing PIR/PUR foam of the present invention can be used to manufacture many types of foam. This catalyst system is useful, for example, in the formation of foam products for rigid and flame retardant applications, which usually require a high Isocyanate Index. As defined previously, Isocyanate Index is the actual amount of polyisocyanate used divided by the theoretically required stoichiometric amount of polyisocyanate required to react with all the active hydrogen in the reaction mixture, multiplied by 100. For purposes of the present invention, Isocyanate Index is represented by the equation: Isocyanate Index= (Eq NCO/Eq of active hydrogen)×100, wherein Eq NCO is the number of NCO functional groups in the polyisocyanate, and Eq of active hydrogen is the number of equivalent active hydrogen atoms.

Foam products which are produced with an Isocyanate Index from about 80 to about 800 are within the scope of this invention. In accordance with other aspects of the present invention, the Isocyanate Index ranges from about 100 to about 700, from about 150 to about 650, from about 200 to about 600, or from about 250 to about 500.

Polyols

Active hydrogen-containing compounds for use with the foregoing polyisocyanates in forming the polyisocyanurate/polyurethane foams of this invention can be any of those organic compounds having at least two hydroxyl groups such as, for example, polyols. Polyols that are typically used in PIR/PUR foam formation processes include polyalkylene ether and polyester polyols. The polyalkylene ether polyol includes the poly(alkyleneoxide) polymers such as poly(ethyleneoxide) and poly(propyleneoxide) polymers and copolymers with terminal hydroxyl groups derived from polyhydric compounds, including diols and triols, These include, but are not limited to, ethylene glycol, propylene glycol, 1,3-butane diol, 1,4-butane diol, 1,6-hexane diol, neopentyl glycol, diethylene glycol, dipropylene glycol, pentaerythritol, glycerol, diglycerol, trimethylol propane, cyclohexane diol, and sugars such as sucrose and like low molecular weight polyols.

Amine polyether polyols can be used in the present invention. These can be prepared when an amine such as, for example, ethylenediamine, diethylenetriamine, tolylenediamine, diphenylmethanediamine, or triethanolamine is reacted with ethylene oxide or propylene oxide.

In another aspect of the present invention, a single high molecular weight polyether polyol, or a mixture of high molecular weight polyether polyols, such as mixtures of different multifunctional materials and/or different molecular weight or different chemical composition materials can be used.

In yet another aspect of the present invention, polyester polyols can be used, including those produced when a dicarboxylic acid is reacted with an excess of a diol. Non-limiting examples include adipic acid or phathalic acid or phthalic anhydride reacting with ethylene glycol or butanediol. Polyols useful in the present invention can be produced by reacting a lactone with an excess of a diol, for example, caprolactone reacted with propylene glycol. In a further aspect, active hydrogen-containing compounds such as polyester polyols and polyether polyols, and combinations thereof, are useful in the present invention.

Blowing Agents

In accordance with the compositions, foam formulations, and methods of producing PIR/PUR foam within the scope of the present invention, suitable blowing agents that can be used alone or in combination include, but are not limited to, water, methylene chloride, acetone, hydrofluorocarbons (HFCs), hydrochlorofluorocarbons (HCFCs), and hydrocarbons. Examples of HFCs include, but are not limited to, HFC-245fa, HFC-134a, and HFC-365; illustrative examples of HCFCs include, but are not limited to, HCFC-141b, HCFC-22, and HCFC-123. Exemplary hydrocarbons include, but are not limited to, n-pentane, iso-pentane, cyclopentane, and the like, or any combination thereof. In one aspect of the present invention, the blowing agent or mixture of blowing agents comprises at least one hydrocarbon. In another aspect, the blowing agent comprises n-pentane. Yet, in another aspect of the present invention, the blowing agent consists essentially of n-pentane or mixtures of n-pentane with one or more blowing agents.

Due to the discovery that chlorofluorocarbons (CFCs) can deplete ozone in the stratosphere, this class of blowing agents is not desirable for use in the present invention. A chlorofluorocarbon (CFC) is an alkane in which all hydrogen atoms are substituted with chlorine and fluorine atoms. Examples of CFCs include trichlorofluoromethane and dichlorodifluoromethane. Thus, compositions in accordance with the present invention comprise only non-CFC blowing agents.

The amount of blowing agent used can vary based on, for example, the intended use and application of the foam product and the desired foam stiffness and density. In the compositions, foam formulations and methods for preparing a polyisocyanurate/polyurethane foam of the present invention, the blowing agent is present in amounts from about 10 to about 80 parts by weight per hundred weight parts of the at least one active hydrogen-containing compound. In another aspect, the blowing agent is present in amounts from about 12 to about 60, from about 14 to about 50, or from about 16 to about 40, parts by weight per hundred weight parts of the at least one active hydrogen-containing compound. If the at least one active hydrogen-containing compound is an at least one polyol, the blowing agent is present in amounts from about 10 to about 80 parts by weight per hundred weight parts polyol (pphp), from about 12 to about 60 pphp, from about 14 to about 50 pphp, or from about 16 to about 40 pphp.

If water is present in the formulation, for use as a blowing agent or otherwise, water is present in amounts up to about 15 parts by weight per hundred weight parts of the at least one active hydrogen-containing compound. Likewise, if the at least one active hydrogen-containing compound is an at least one polyol, water can range from 0 to about 15 pphp. In another aspect, water can range from 0 to about 10 pphp, from 0 to about 8 pphp, from 0 to about 6 pphp, or from 0 to about 4 pphp.

Urethane Catalyst

Urethane catalysts accelerate the reaction to form polyurethanes, and can be used as a further component of the catalyst systems and compositions of the present invention to produce polyisocyanurate/polyurethane foam. Urethane catalysts suitable for use herein include, but are not limited to, metal salt catalysts, such as organotins, and amine compounds, such as triethylenediamine (TEDA), N-methylimidazole, 1,2-dimethyl-imidazole, N-methylmorpholine (commercially available as the DABCO® NMM catalyst), N-ethylmorpholine (commercially available as the DABCO® NEM catalyst), triethylamine (commercially available as the DABCO® TETN catalyst), N,N'-dimethylpiperazine, 1,3,5-tris(dimethylaminopropyl)hexahydrotriazine (commercially available as the Polycat® 41 catalyst), 2,4,6-tris(dimethylaminomethyl)phenol (commercially available as the DABCO TMR® 30 catalyst), N-methyldicyclohexylamine (commercially available as the Polycat® 12 catalyst), pentamethyldipropylene triamine (commercially available as the Polycat® 77 catalyst), N-methyl-N'-(2-dimethylamino)-ethyl-piperazine, tributylamine, pentamethyl-diethylenetriamine (commercially available as the Polycat® 5 catalyst), hexamethyl-triethylenetetramine, heptamethyltetraethylenepentamine, dimethylaminocyclohexyl-amine (commercially available as the Polycate® 8 catalyst), pentamethyldipropylene-triamine, triethanolamine, dimethylethanolamine, bis (dimethylaminoethyl)ether (commercially available as the DABCO® BL19 catalyst), tris(3-dimethylamino)-propylamine (commercially available as the Polycat® 9 catalyst), 1,8-diazabicyclo undecene (commercially available as the DABCO® DBU catalyst) or its acid blocked derivatives, and the like, as well as any mixture thereof. Particularly useful as a urethane catalyst for foam applications related to the present invention is the Polycat® 5 catalyst, which is known chemically as pentamethyidiethylenetriamine.

For preparing a polyisocyanurate/polyurethane foam of the present invention, the urethane catalyst can be present in the formulation from 0 to about 10 pphp, from 0 to about 8 pphp, from 0 to about 6 pphp, from 0 to about 4 pphp, from 0 to about 2 pphp, or from 0 to about 1 pphp. In another aspect, the urethane catalyst is present from 0 to about 0.8 pphp, from 0 to about 0.6 pphp, from 0 to about 0.4 pphp, or from 0 to about 0.2 pphp.

Miscellaneous Additives

Depending upon on the requirements during foam manufacturing or for the end-use application of the foam product, various additives can be employed in the PIR/PUR foam formulation to tailor specific properties. These include, but are not limited to, cell stabilizers, flame retardants, chain extenders, epoxy resins, acrylic resins, fillers, pigments, or any combination thereof. It is understood that other mixtures or materials that are known in the art can be included in the foam formulations and are within the scope of the present invention.

Cell stabilizers include surfactants such as organopolysiloxanes. Silicon surfactants can be present in the foam formulation in amounts from about 0.5 to about 10 pphp, about 0.6 to about 9 pphp, about 0.7 to about 8 pphp, about 0.8 to about 7 pphp, about 0.9 to about 6 pphp, about 1 to about 5 pphp, or about 1.1 to about 4 pphp. Useful flame retardants include halogenated organophosphorous compounds and non-halogenated compounds. A non-limiting example of a halogenated flame retardant is trichloropropylphosphate (TCPP). For example, triethylphosphate ester (TEP) and DMMP are non-halogenated flame retardants. Depending on the end-use foam application, flame retardants can be present in the foam formulation in amounts from 0 to about 50 pphp, from 0 to about 40 pphp, from 0 to about 30 pphp, or from 0 to about 20 pphp. In another aspect, the flame retardant is present from 0 to about 15 pphp, 0 to about 10 pphp, 0 to about 7 pphp, or 0 to about 5 pphp. Chain extenders such as ethylene glycol and butane diol can also be employed in the present invention. Ethylene glycol, for instance, can also be present in the formulation as a diluent or solvent for the carboxylate salt catalysts of the present invention.

Polyisocyanurate/Polyurethane Foam Formulation and Process

One aspect of the present invention provides for a composition comprising the contact product of at least one active hydrogen-containing compound, at least one blowing agent, and a catalyst composition comprising at least one sterically hindered carboxylate salt. Another aspect provides a composition comprising the contact product of at least one polyisocyanate, at least one blowing agent, and a catalyst composition comprising at least one sterically hindered carboxylate salt. In both of these two compositions, the composition can further comprise at least one urethane catalyst. Likewise, the compositions can further comprise at least one additive selected from at least one cell stabilizer, at least one flame retardant, at least one chain extender, at least one epoxy resin, at least one acrylic resin, at least one filler, at least one pigment, or any combination thereof.

The present invention provides a method for preparing a polyisocyanurate/polyurethane (PIR/PUR) foam which comprises contacting at least one polyisocyanate with at least one active hydrogen-containing compound, in the presence of at least one blowing agent and an effective amount of a catalyst composition comprising at least one sterically hindered carboxylate salt. In accordance with the method of the present invention, PIR/PUR foams can be produced having a density from about 20 Kg/m$^3$ to about 250 Kg/m$^3$ (about 1.25 lb/ft$^3$ to about 15.5 lb/ft$^3$), or from about 24 Kg/m$^3$ to about 60 Kg/m$^3$ (about 1.5 lb/ft$^3$ to about 3.75 lb/ft$^3$).

In another aspect, the method of the present invention offers a substantially consistent foam height rise versus time—even at a high Isocyanate Index—that is highly desired for continuous foam manufacturing operations. The method for preparing PIR/PUR foams also can provide equivalent or faster surface cure when compared to other commercially available catalyst systems, such that the PIR/PUR foam has enhanced surface adherence, useful for the production are articles such as laminated foam panels.

Optionally, in yet another aspect, the method of the present invention can produce PIR/PUR foams with no or substantially no undesirable amine odor. Dependent upon the selection of the specific at least one sterically hindered carboxylate salt, this method can provide thermal stability at the temperatures which PIR/PUR foams normally encounter during manufacturing, even those foams formulated with a high Isocyanate Index. In a further aspect, the method for preparing PIR/PUR foam has thermally stability up to about 150° C., or about 175° C., or about 200° C., or about 220° C., or about 240° C., or about 250° C. In a still further aspect, the method of the present invention produces PIR/PUR foam that is substantially free of volatile amines and/or amine odors.

The catalyst composition comprising at least one sterically hindered carboxylate salt should be present in the foam formulation in a catalytically effective amount. In PIR/PUR foam formulations of the present invention, the catalyst composition is present in amounts from about 0.05 to about 10 parts by weight per hundred weight parts of the at least one active hydrogen-containing compound, excluding the weight contribution of the catalyst system diluent. In another aspect, the catalyst composition is present in amounts from about 0.4 to about 9 parts, or from about 0.8 to about 8 parts, by weight per hundred weight parts of the at least one active hydrogen-containing compound. If the at least one active hydrogen-containing compound is an at least one polyol, the catalyst composition is present in amounts from about 0.05 to about 10 parts by weight per hundred weight parts polyol (pphp). In another aspect, the catalyst composition is present in amounts from about 0.2 to about 9.5 pphp, about 0.4 to about 9 pphp, about 0.6 to about 8.5 pphp, or about 0.8 to about 8 pphp.

In accordance with one aspect of the method of the present invention, the components of the foam formulation are contacted substantially contemporaneously. For example, at least one polyisocyanate, at least one active hydrogen-containing compound, at least one blowing agent and an effective amount of a catalyst composition comprising at least one sterically hindered carboxylate salt, are contacted together. Given the number of components involved in PIR/PUR formulations, there are many different orders of combining the components, and one of skill in the art would realize that varying the order of addition of the components falls within the scope of the present invention. As well, for each of the different orders of combining the aforementioned components of the foam formulation, the foam formulation of the present invention can further comprise at least one urethane catalyst. In addition, the method of producing PIR/PUR foams can further comprise the presence of at least one additive selected from at least one cell stabilizer, at least one flame retardant, at least one chain extender, at least one epoxy resin, at least one acrylic resin, at least one filler, at least one pigment, or any combination thereof. In one aspect of the present invention, all of the components, including optional components, are contacted substantially contemporaneously.

In another aspect of the present invention, a premix of ingredients other than the at least one polyisocyanate are contacted first, followed by the addition of the at least one polyisocyanate. For example, the at least one active hydrogen-containing compound, the at least one blowing agent, and the catalyst composition of the present invention are contacted initially to form a premix. The premix is then contacted with the at least one polyisocyanate to produce PIR/PUR foams in accordance with the method of the present invention. In a further aspect of the present invention, the same method can be employed, wherein the premix further comprises at least one urethane catalyst. Likewise, the premix can further comprise at least one additive selected from at least one cell stabilizer, at least one flame retardant, at least one chain extender, at least one epoxy resin, at least one acrylic resin, at least one filler, at least one pigment, or any combination thereof.

One aspect of the present invention provides a method for preparing a polyisocyanurate/polyurethane foam comprising
(a) forming a premix comprising:
   i) at least one polyol;
   ii) about 10 to about 80 parts by weight per hundred weight parts of the polyol (pphp) blowing agent;
   iii) about 0.5 to about 10 pphp silicon surfactant;
   iv) zero to about 10 pphp water;
   v) zero to about 50 pphp flame retardant;
   vi) zero to about 10 pphp urethane catalyst; and
   vii) about 0.05 to about 10 pphp of a catalyst composition comprising at least one sterically hindered carboxylate salt; and
(b) contacting the premix with at least one polyisocyanate at an Isocyanate Index from about 80 to about 800.

As indicated previously, the blowing agent is not a chlorofluorocarbon (CFC).

EXAMPLES

The foams of examples 1-7 were produced by adding a catalyst of the present invention into a premix of a polyol, flame retardant (TCPP), surfactant, urethane catalyst (Polycat® 5 catalyst), and blowing agent (n-pentane), in a 32-oz (951 ml) metal cup. This composition was mixed for about 10 seconds (s) at about 6,000 RPM using an overhead stirrer fitted with a 2-inch (5.1 cm) diameter stirring paddle. Sufficient isocyanate was then added to achieve the desired Isocyanate Index, and the formulation was mixed well for about 6 seconds (s) at about 6,000 RPM using the same stirrer. The 32-oz cup was dropped through a hole in the bottom of a 128-oz (3804 ml) paper cup on a stand. The hole was sized appropriately to catch the lip of the 32-oz cup. The total volume of the foam container was about 160 oz (4755 ml). Foams approximated this volume at the end of the foam forming reaction. Foam height over time was recorded. String gel time and tack free time were measured manually with a wooden stick (e.g., tongue depressor or popsicle stick) and chronometer. Start time and rise time were determined with automated rate of rise equipment.

In examples 1-7, various types and quantities of catalysts were used to produce PIR/PUR foams of the present invention. Although the amounts of each catalyst are not the same in these examples, the respective catalyst quantities were chosen to provide similar string gel times. PIR/PUR foam properties are typically compared at equivalent string gel times. In these examples, unless otherwise specified, the pphp values listed for the carboxylate salt catalysts exclude the additional weight of the diluent. Table I lists the components of the foam formulation and their respective pphp that are used in these examples.

TABLE I

Formulations of Foams in Examples 1-7 (catalyst varied)

| COMPONENT | PARTS (weight) |
| --- | --- |
| Polyester Polyol | 100 |
| TCPP | 4.7 |
| Surfactant | 1.7 |
| Polycat ® 5 catalyst | 0.15 |
| n-Pentane | 17 |
| Trimer Catalyst | Varied |
| Isocyanate Index | Varied (250-500) |

Inventive Example 1

Comparison of a Potassium Pivalate Catalyst with Standard Catalysts

Sterically hindered carboxylate salt catalyst 1 was prepared by dissolving potassium hydroxide in ethylene glycol, followed by neutralization by the addition of an equivalent amount of pivalic acid. After neutralization, the water was removed by vacuum distillation. The resulting approximate 50% solution of potassium pivalate (about 2 pphp or about 2 grams excluding diluent) in ethylene glycol constituted inventive catalyst 1. Foams were made using the standard formulation in Table I at an Isocyanate Index of about 500.

Catalyst 1 was compared with two commercial standards, the DABCO® K15 catalyst (70% potassium octoate solution) and the DABCO TMR® catalyst (75% 2-hydroxypropyltrimethylammonium octoate solution). Approximately 4.6 pphp of the DABCO® K15 catalyst were used; excluding diluent, this converts to about 3.2 pphp or about 3.2 grams of potassium octoate. Approximately 4.8 pphp of the DABCO TMR® catalyst were used; excluding diluent, this converts to about 3.6 pphp or about 3.6 grams of 2-hydroxypropyltrimethylammonium octoate. Table II shows foam parameters such as start time, string gel time, height of string gel time (HSG), rise time and tack free time, for inventive catalyst 1 and the standard catalysts. The string gel time for catalyst 1 was about 8 seconds longer than for the standard catalysts. If more pphp of catalyst 1 were used to drop the string gel time to match the standard catalysts, the tack free time would likewise drop. Hence, the tack free times for catalyst 1, the DABCO TMR® catalyst, and the DABCO® K15 catalyst are substantially the same, suggesting similar surface curing time.

FIG. 1 compares the foam height versus time for inventive catalyst 1, the DABCO® K15 catalyst, and the DABCO TMR® catalyst. The DABCO® K15 catalyst and catalyst 1 are both alkali metal carboxylate salt catalysts; however, catalyst 1 is a sterically hindered alkali metal carboxylate salt catalyst. The normalized foam height for catalyst 1 has a more uniform slope and less pronounced plateau as compared to the that of the DABCO® K15 catalyst. This translates to a more consistent foam height rise and is a processing improvement relative to the DABCO® K15 catalyst. Catalyst 1 does not have the smooth profile of foam height versus time that is characteristic of the DABCO TMR® catalyst (2-hydroxylpropyltrimethylammonium octoate), but it is an improvement over the DABCO® K15 catalyst.

Figure 2:
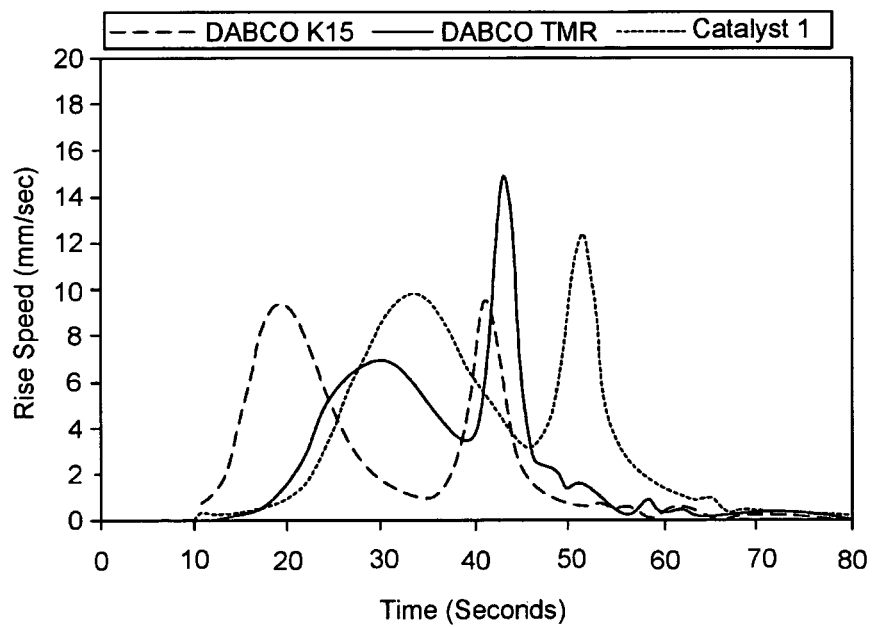
FIG. 2 presents a plot of the rate of foam rise speed versus time for sterically hindered carboxylate salt catalyst 1, the DABCO® K15 catalyst, and the DABCO TMR® catalyst, at an Isocyanate Index of about 500.

FIG. 2 illustrates that catalyst 1 has a smaller trimerization "step" as compared to that of potassium octoate (the DABCO® K15 catalyst). The DABCO® K15 catalyst has a long valley in between the two peaks, indicating the different foam rise speeds associated with foam production using this catalyst. Catalyst 1 represents an improvement over the DABCO® K15 catalyst in this regard. Neither the DABCO® K15 catalyst nor catalyst 1 has a short valley between the peaks like the DABCO TMR® catalyst; this short valley is indicative of a less significant trimerization step and a more consistent foam rise speed throughout foam production.

The DABCO TMR® catalyst, however, can be thermally unstable at the elevated temperatures often encountered during PIR/PUR foam processing, decomposing into volatile amine by-products. Sterically hindered carboxylate salt catalyst 1 has thermal stability to over 150° C. and can produce PIR/PUR foam which is substantially free of volatile amines and amine odors.

Inventive Example 2

Comparison of a Dimethyldiallylammonium Pivalate Catalyst with Standard Catalysts Sterically hindered carboxylate salt catalyst 2 was prepared by mixing an approximate 65% solution of dimethyldiallylammonium chloride in water with sodium hydroxide. The resulting dimethyldiallylammonium hydroxide was dissolved in ethylene glycol, following by neutralization by the addition of an equivalent amount of pivalic acid. After neutralization, the water was removed by vacuum distillation. The resulting approximate 50% solution of dimethyldiallylammonium pivalate (about 2.5 pphp or about 2.5 grams, excluding diluent) in ethylene glycol constituted inventive catalyst 2. Foams were made using the standard formulation in Table I at an Isocyanate Index of about 500.

Catalyst 2 was compared with two commercial standards, the DABCO® K15 catalyst (70% potassium octoate solution) and the DABCO TMR® catalyst (75% 2-hydroxypropyltrimethylammonium octoate solution). Approximately 4.6 pphp of the DABCO® K15 catalyst were used; excluding diluent, this converts to about 3.2 pphp or about 3.2 grams of potassium octoate. Approximately 4.8 pphp of the DABCO TMR® catalyst were used; excluding diluent, this converts to about 3.6 pphp or about 3.6 grams of 2-hydroxypropyltrimethylammonium octoate.

As shown in Table II, at a slightly higher string gel time, inventive catalyst 2 provided a tack free time of about 61 seconds, substantially equivalent to the tack free times of both the DABCO® K15 catalyst and the DABCO TMR® catalyst. Inventive catalyst 2 thus produced a foam product with similar or slightly better surface cure rates and surface adherence during the manufacture of finished products such as laminated foam panels.

Figure 3:
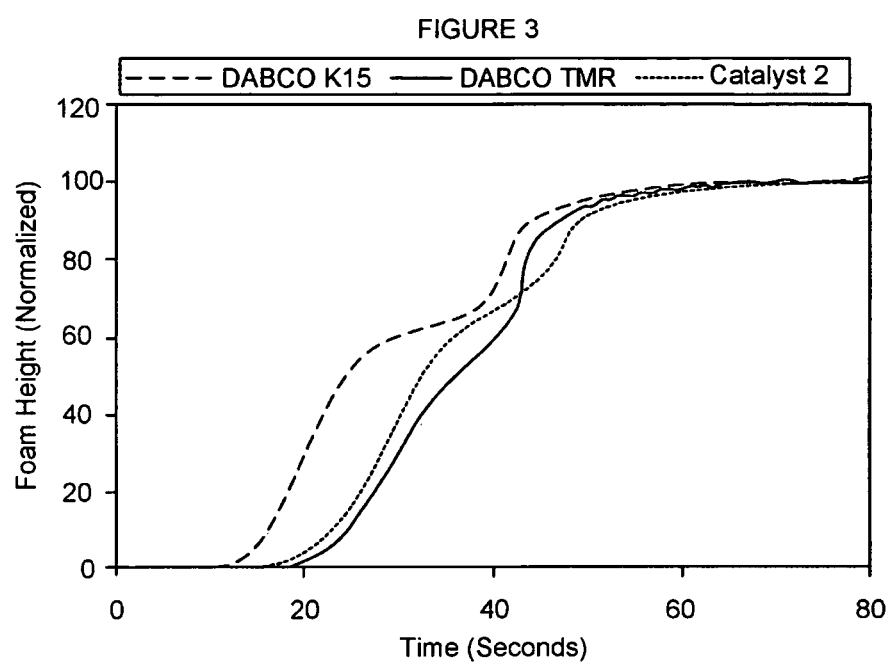
FIG. 3 presents a plot of the normalized foam height versus time for sterically hindered carboxylate salt catalyst 2, the DABCO® K15 catalyst, and the DABCO TMR® catalyst, at an Isocyanate Index of about 500.

FIG. 3 compares the foam height versus time for inventive catalyst 2, the DABCO® K15 catalyst, and the DABCO TMR® catalyst. The catalyst 2 curve has a slope that is more uniform than that of the DABCO® K15 catalyst, and slightly less than that of the DABCO TMR® catalyst. Hence, foam produced with inventive catalyst 2 would have a more consistent foam rise or foam expansion speed over time as compared to the DABCO® K15 catalyst. This is a desirable feature for continuous foam operations, such as those operations which include lamination processes. The performance of catalyst 2 approaches the consistent foam height rise and processability associated with the DABCO TMR® catalyst, but catalyst 2 does not have the thermal instability and amine order concerns of the DABCO TMR® catalyst.

Inventive Examples 3 and 4

Comparison of a Potassium Neodecanoate Catalyst and a Potassium Neoheptanoate Catalyst with Standard Catalysts Sterically hindered carboxylate salt catalyst 3 was prepared by dissolving potassium hydroxide in ethylene glycol, followed by neutralization by the addition of an equivalent amount of neodecanoic acid. After neutralization, the water was removed by vacuum distillation. The resulting approximate 71% solution of potassium neodecanoate (about 3.5 pphp or about 3.5 grams, excluding diluent) in ethylene glycol constituted inventive catalyst 3. Similarly, sterically hindered carboxylate salt catalyst 4 was prepared by dissolving potassium hydroxide in ethylene glycol, followed by neutralization by the addition of an equivalent amount of neoheptanoic acid. After neutralization, the water was removed by vacuum distillation. The resulting approximate 71% solution of potassium neoheptanoate (about 2.8 pphp or 2.8 grams, excluding diluent) in ethylene glycol constituted inventive catalyst 4. Foams using both catalysts 3 and 4 were made using the standard formulation in Table I at an Isocyanate Index of about 500.

Catalysts 3 and 4 were compared with two commercial standards, the DABCO® K15 catalyst (70% potassium octoate solution) and the DABCO TMR® catalyst (75% 2-hydroxypropyltrimethylammonium octoate solution). Approximately 4.6 pphp of the DABCO® K15 catalyst were used; excluding diluent, this converts to about 3.2 pphp about or 3.2 grams of potassium octoate. Approximately 4.8 pphp of the DABCO TMR® catalyst were used; excluding diluent, this converts to about 3.6 pphp or about 3.6 grams of 2-hydroxypropyltrimethylammonium octoate.

Table II summarizes foam parameters such as start time, string gel time, height of string gel time (HSG), rise time and tack free time, for inventive catalysts 3 and 4 and the standard catalysts. The string gel time for catalyst 3 was about 11 seconds longer than for the standard catalysts, but even if it were matched, the tack free time would not be similar to the standard catalysts. Catalyst 3 can be used to produce quality PIR/PUR foam, but it is not as catalytically active as the standard catalysts at this specific Isocyanate Index and foam formulation. The string gel time for catalyst 4 was about 6 seconds longer than for the standard catalysts. If more pphp of catalyst 4 were used to decrease the string gel time to match the standard catalysts, the tack free time would likewise decrease. Hence, the tack free times for catalyst 4, the DABCO TMR® catalyst, and the DABCO® K15 catalyst are substantially the same, suggesting similar surface curing time.

Not wishing to be bound by theory, it is believed that the tack free time and surface cure performance of catalyst 4 relative to catalyst 3 can be explained by the length of the carbon chain attached to the carboxylic moiety. Catalyst 3 (potassium neodecanoate) has 10 total carbon atoms, while catalyst 4 (potassium neoheptanoate) has 7 total carbon atoms. Not intending to be bound by this theory, but under these particular PIR/PUR foam conditions, the effect of the steric hindrance on catalyst activity appears to be impacted by the length of the carbon chain.

Figure 4:
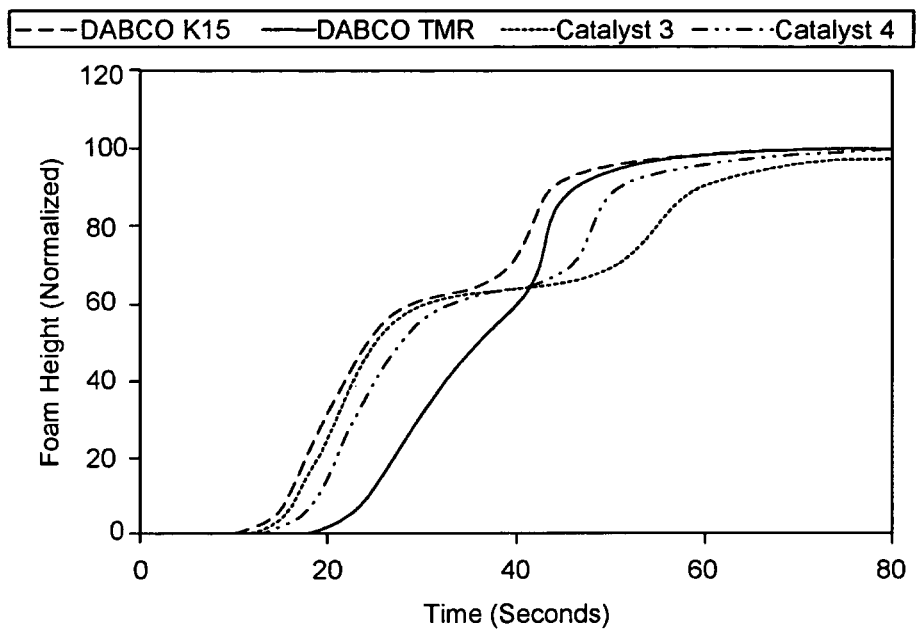
FIG. 4 presents a plot of the normalized foam height versus time for sterically hindered carboxylate salt catalysts 3 and 4, the DABCO® K15 catalyst, and the DABCO TMR® catalyst, at an Isocyanate Index of about 500.

FIG. 4 compares the foam height versus time for inventive catalysts 3 and 4, the DABCO® K15 catalyst, and the DABCO TMR® catalyst. The DABCO® K15 catalyst and catalysts 3 and 4 are alkali metal carboxylate salt catalysts; however, catalysts 3 and 4 are sterically hindered alkali metal carboxylate salt catalysts of different chain lengths. The normalized foam height curve for catalyst 3 has a more pronounced plateau as compared to that of the DABCO® K15 catalyst. As with the tack free time and surface cure data, catalyst 3 is not as catalytically active as the standard catalysts at this particular foam formulation. However, catalyst 4 has a curve shape and slope very similar to that of the DABCO® K15 catalyst. Thus, catalyst 4 would be expected to provide similar foam rise and processing characteristics relative to the DABCO® K15 catalyst. None of the catalysts in FIG. 4 have the smooth profile of foam height versus time that is characteristic of the DABCO TMR® catalyst (2-hydroxylpropyltrimethylammonium octoate). Sterically hindered carboxylate salt catalysts 3 and 4, however, have thermal stability advantages over the DABCO TMR® catalyst. Catalysts 3 and 4 are thermally stable to over 150° C. and can produce PIR/PUR foams which are substantially free of volatile amines and amine odors.

TABLE II

Foam comparison of catalysts 1-4 to standard catalysts

| Catalyst | Start Time [s] | String Gel Time [s] | HSG [%] | Rise Time [s] | Tack Free Time [s] |
|---|---|---|---|---|---|
| $^a$4.6 pphp DABCO ® K15 | 13 | 44 | 90 | 61 | 61 |
| $^b$4.8 pphp DABCO TMR ® | 20 | 44 | 83 | 50 | 60 |
| $^c$2 pphp Catalyst 1 | 22 | 52 | 83 | 70 | 69 |
| $^c$2.5 pphp Catalyst 2 | 18 | 48 | 86 | 65 | 61 |
| $^c$3.5 pphp Catalyst 3 | 14 | 55 | 80 | 85 | 100 |
| $^c$2.8 pphp Catalyst 4 | 15 | 50 | 88 | 66 | 67 |

Notes:
$^a$4.6 pphp DABCO ® K15 catalyst including diluent converts to about 3.2 pphp of potassium octoate salt catalyst excluding diluent.
$^b$4.8 pphp DABCO TMR ® catalyst including diluent converts to about 3.6 pphp of 2-hydroxypropyltrimethylammonium octoate catalyst excluding diluent.
$^c$Catalyst 1-4 pphp values exclude the diluent.

Inventive Example 5

Comparison of a Tetramethylammonium Pivalate Catalyst with Standard Catalysts

Sterically hindered carboxylate salt catalyst 5 was prepared by mixing an approximate 25% solution of tetramethylammonium hydroxide in methanol with ethylene glycol, followed by neutralization by the addition of an equivalent amount of pivalic acid. After neutralization, the methanol and the water were removed by vacuum distillation. The resulting approximate 50% solution of tetramethylammonium pivalate (about 1.25 pphp or about 1.25 grams, excluding diluent) in ethylene glycol constituted inventive catalyst 5. Foams were made using the standard formulation in Table I at an Isocyanate Index of about 270.

Catalyst 5 was compared with two commercial standard catalyst solutions, the DABCO® K15 catalyst (70% potassium octoate solution) and the DABCO TMR® catalyst (75% 2-hydroxypropyltrimethylammonium octoate solution). Approximately 2.1 pphp of the DABCO® K15 catalyst were used; excluding diluent, this converts to about 1.5 pphp or about 1.5 grams of potassium octoate. Approximately 2.9 pphp of the DABCO TMR® catalyst were used; excluding diluent, this converts to about 2.2 pphp or about 2.2 grams of 2-hydroxypropyltrimethylammonium octoate.

As shown in Table III, at a similar string gel time, inventive catalyst 5 had a tack free time of about 67 seconds, much shorter than that achieved with either the DABCO® K15 catalyst or the DABCO TMR® catalyst. As such, catalyst 5 would produce foam with a faster surface cure, less surface friability, and subsequently, better adhesion performance in laminated foam structures, as compared to either the DABCO® K15 catalyst or the DABCO TMR® catalyst.

Figure 5:
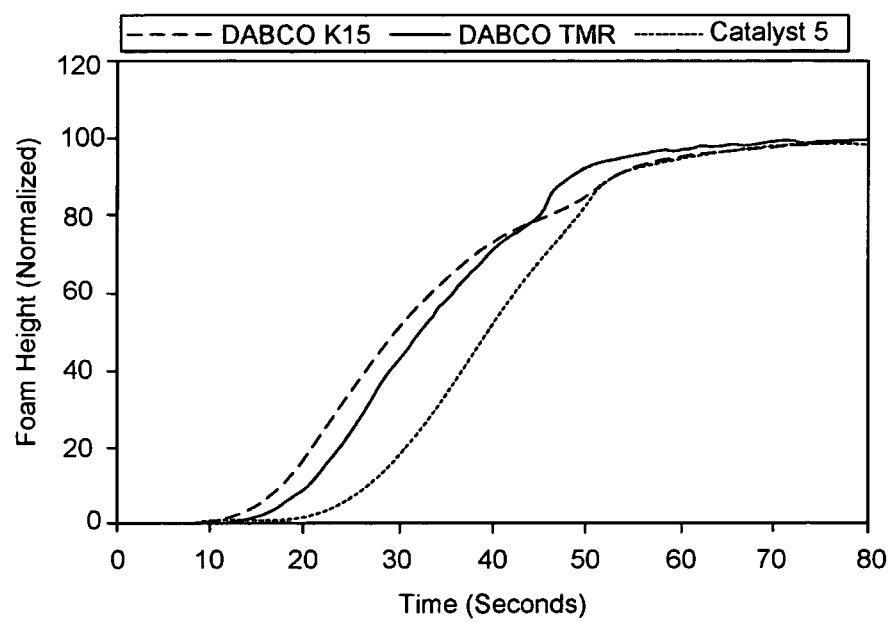
FIG. 5 presents a plot of the normalized foam height versus time for sterically hindered carboxylate salt catalyst 5, the DABCO® K15 catalyst, and the DABCO TMR® catalyst, at an Isocyanate Index of about 270.

FIG. 5 compares the foam height versus time for inventive catalyst 5, the DABCO® K15 catalyst, and the DABCO TMR® catalyst. The curve for catalyst 5 has a slope that is more uniform than either that of the DABCO® K15 catalyst or the DABCO TMR® catalyst. Hence, foam produced with inventive catalyst 5 would have the most consistent foam rise or foam expansion speed over time. This is a useful feature for continuous PIR/PUR foam operations, such as those involving lamination processes.

Figure 6:
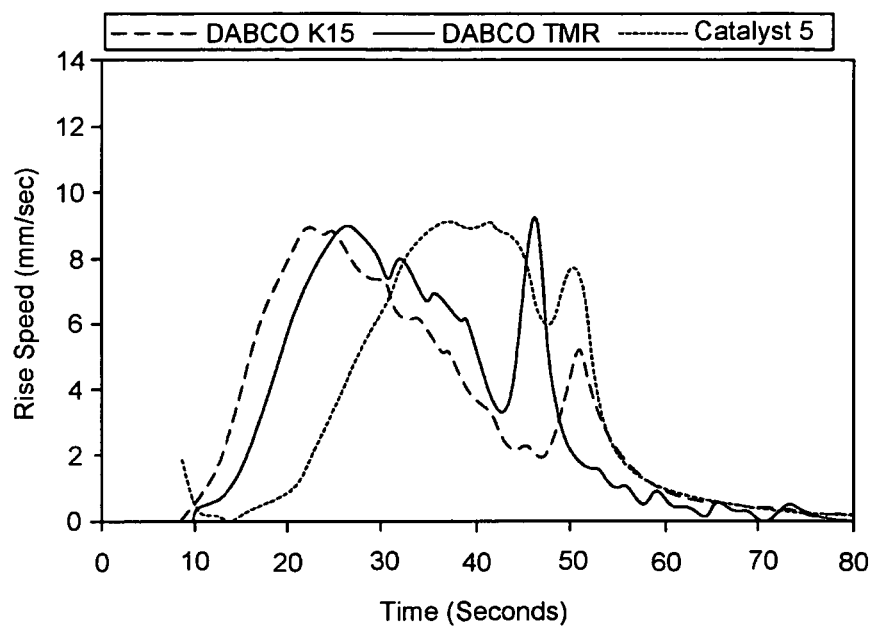
FIG. 6 presents a plot of the rate of foam rise speed versus time for sterically hindered carboxylate salt catalyst 5, the DABCO® K15 catalyst, and the DABCO TMR® catalyst, at an Isocyanate Index of about 270.

The near absence of a trimerization "step" with inventive catalyst 5 is illustrated further by both the short and the shallow valley between the two peaks in FIG. 6. Catalyst 5 offers a substantially consistent foam rise speed over a long time interval. This feature is highly desired in PIR/PUR foam production operations.

TABLE III

Foam comparison of catalyst 5 to standard catalysts

| Catalyst | Start Time [s] | String Gel Time [s] | HSG [%] | Rise Time [s] | Tack Free Time [s] |
|---|---|---|---|---|---|
| [a]2.1 pphp DABCO ® K15 | 14 | 54 | 91 | 72 | 108 |
| [b]2.9 pphp DABCO TMR ® | 16 | 49 | 91 | 65 | 77 |
| [c]1.25 pphp Catalyst 5 | 20 | 50 | 83 | 70 | 67 |

Notes:
[a]2.1 pphp DABCO ® K15 catalyst including diluent converts to about 1.5 pphp of potassium octoate salt catalyst excluding diluent.
[b]2.9 pphp DABCO TMR ® catalyst including diluent converts to about 2.2 pphp of 2-hydroxypropyltrimethylammonium octoate catalyst excluding diluent.
[c]Catalyst 5 pphp value excludes the diluent.

Inventive Example 6

Comparison of Inventive Catalyst Compositions Comprising a Sterically Hindered Carboxylate Salt and an Optional Alkali Metal Carboxylate Salt (Potassium Octoate) with the Standard DABCO® K15 Potassium Octoate Catalyst Inventive catalysts compositions were prepared by mixing a potassium pivalate solution (a sterically hindered carboxylate salt; catalyst 1) with an alkali metal carboxylate salt solution in varying weight ratios. The alkali metal carboxylate salt was potassium octoate, commercially available in solution as the DABCO® K15 catalyst. Foams were made using the standard formulation in Table I at an Isocyanate Index of about 250 and a catalyst loading of about 4.5% by weight of the total premix. The premix includes the components of the foam formulation in Table I other than the isocyanate.

A K15/Catalyst 1 weight ratio of about 3:1 including diluent converts to about 4.2:1 excluding diluent. Similarly, a K15/Catalyst 1 weight ratio of about 1:1 including diluent converts to about 1.4:1 excluding diluent.

Figure 7:
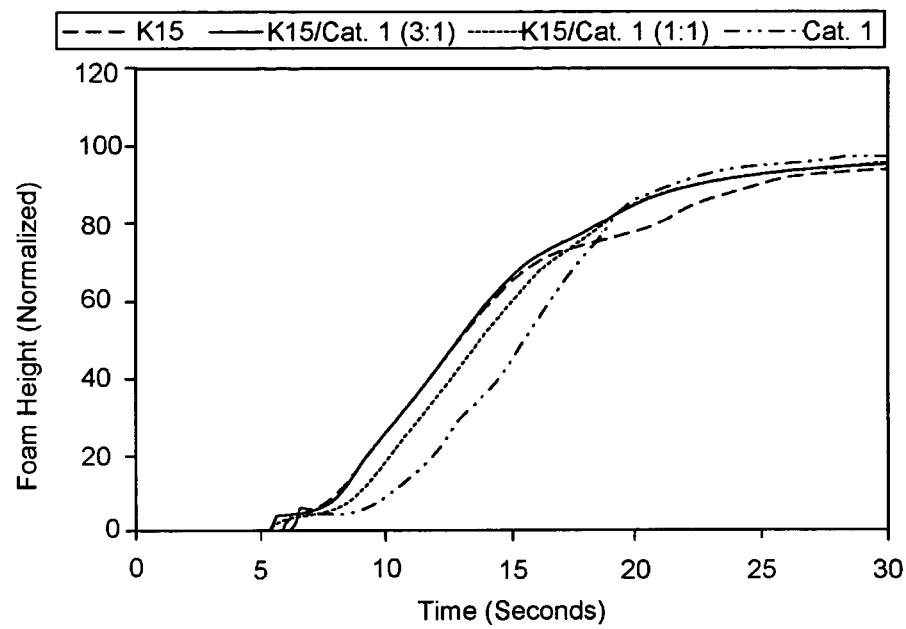
FIG. 7 presents a plot of the normalized foam height versus time for inventive catalyst combinations of the DABCO® K15 catalyst and sterically hindered carboxylate salt catalyst 1, at an Isocyanate Index of about 250.

FIG. 7 compares the foam height versus time for two different weight ratios, including the diluent, of the DABCO® K15 catalyst to catalyst 1, and that of catalyst 1 used at 100% and the DABCO® K15 catalyst used at 100%. As the amount of catalyst 1 (potassium pivalate) increased relative to the amount of the DABCO® K15 catalyst (potassium octoate), a smoother profile of foam height versus time resulted. Specifically, as the amount of catalyst 1 increased, the foam height versus time curves had more uniform slopes and less pronounced plateaus. The curve for catalyst 1 (100% potassium pivalate) in FIG. 7 has the most consistent foam rise over time, which is desirable for continuous PIR/PUR foam operations.

Figure 8:
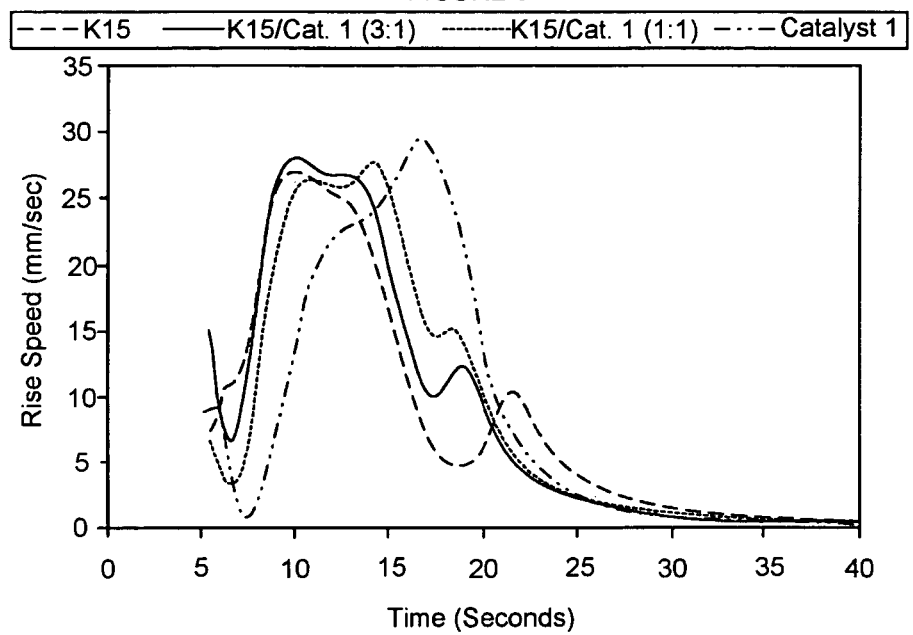
FIG. 8 presents a plot of the rate of foam rise speed versus time for inventive catalyst combinations of the DABCO® K15 catalyst and sterically hindered carboxylate salt catalyst 1, at an Isocyanate Index of about 250.

FIG. 8 illustrates that the addition of catalyst 1 (potassium pivalate) to the DABCO® K15 catalyst reduces the depth and length of the valley between the peaks, indicating more consistent foam rise speeds. Catalyst 1, as compared to the DABCO® K15 catalyst, has essentially one peak. The peak normally associated with the trimerization "step" has merged with the larger peak. This desired kinetic profile is commonly observed in PUR foam, but is generally not found in PIR/PUR foam.

Inventive Example 7

Comparison of the Surface Friability of PIR/PUR Foams Produced using Inventive Sterically Hindered Carboxylate Salts with Foam Produced from a Standard Mixed Carboxylate Salt Formulation.

Comparative catalyst 6 was prepared by mixing about 4.8 pphp of the DABCO® K15 catalyst (70% potassium octoate solution) with about 1.0 pphp of the Polycat® 46 catalyst (30% potassium acetate solution). Excluding diluent, catalyst 6 includes about 3.4 pphp potassium octoate and about 0.3 pphp of potassium acetate. Comparative catalyst 6 is a standard catalyst formulation used in the commercial production of PIR/PUR foam. Inventive catalyst 7 comprised about 5.8 pphp of a 50% tetramethylammonium pivalate solution (excluding diluent, about 2.9 pphp). The tetramethylammonium pivalate solution was produced as described previously in Inventive Example 5. Inventive catalyst 8 comprised about 5.8 pphp of a 50% potassium pivalate solution (excluding diluent, about 2.9 pphp). The potassium pivalate solution was produced as described previously in Inventive Example 1. Foams were made using the standard formulation in Table I at an Isocyanate Index of about 250.

The resulting foams made with each catalyst were tested for surface friability in accordance with ASTM C421, which is summarized generally as follows. The surface friability method determines the mass loss of a preformed block-type foam as a result of a combination of abrasion and impact made by a laboratory tumbling mechanism. The test temperature is controlled at about 73° F. and humidity at about 50% relative humidity. Twelve (12) cubes of about ¾" width of the foam material are weighed initially and then placed in an oak box of specific dimensions, which is then filled with twenty-four (24) oak cubes of about ¾" width. The lid to the box is secured, and the box is rotated at about 60 revolutions per minutes for a set number of revolutions (e.g., 600 total revolutions, 1200 total revolutions, etc.). At the conclusion of the test, the foam contents are emptied onto an approximate ⅜" mesh screen where the cubes are tapped gently to remove any dust or small particles. The twelve (12) cubes of foam are then weighed again. The mass loss is defined by taking the difference of the original mass and the final mass, dividing that difference by the original mass, and multiplying by 100 to arrive at a percentage of mass loss.

The mass loss under ASTM C421 correlates with the surface friability of the foam. When the mass loss is high, the polymerized and crosslinked foam network at the surface of the foam is weak. That is, the surface is very friable. Small foam particles at the surface break away easily, leading to poor or weak adhesion in laminated structures. Conversely, when the mass loss is low, the foam surface is less friable. These foams have a strong surface network (crosslinked) and would be well suited for applications such as laminations, where strong adherence to another substrate can be required.

Table IV is a comparison of the surface friability of foams produced using sterically hindered carboxylate salt catalysts (inventive catalysts 7 and 8) with a foam produced using a standard industry catalyst formulation (comparative catalyst 6). Percent mass loss is shown at about 600 and about 1200 revolutions (rev). The foam made from comparative catalyst 6 had poor friability performance. This foam had significant mass loss, over 28% at 1200 revolutions, indicating a weak and friable foam surface. Foams made from sterically hindered carboxylate salt catalyst 7 and 8 had significantly less mass loss, and thus, have a much stronger and less friable surface. Consequently, where strong surface adherence is needed, performance can be improved in laminated foams using sterically hindered carboxylate salt catalysts.

TABLE IV

Surface friability comparison of foams produced using catalysts 6-8

| Catalyst | Friability Data % Mass Loss | |
|---|---|---|
| | 600 Rev | 1200 Rev |
| 6 | 15.9 | 28.5 |
| 7 | 4.7 | 11.3 |
| 8 | 2.2 | 9.4 |

Inventive Example 8

Comparison of a Hydrocarbon Blowing Agent with a Trichlorofluoromethane Blowing Agent Table V lists the composition of a comparative foam formulation 9, which can be used to produce PIR/PUR foams. Table VI lists the composition of an inventive foam formulation 10. Compositions in these tables are listed in weight percentages. The trimer catalyst used is inventive catalyst 1, potassium pivalate, which was produced as described previously in Inventive Example 1.

Comparative foam formulation 9 used trichlorofluoromethane as the blowing agent. Trichlorofluoromethane is a chlorofluorocarbon (CFC). Foams were produced using the foam formulation 9 in Table V with the trichlorofluoromethane blowing agent; the Isocyanate Index was approximately 340. The inventive foam formulation 10 in Table VI was selected to provide substantially equivalent foam height and foam volume to that of the foam formulation 9, but with a hydrocarbon blowing agent, n-pentane. For comparison at substantially equivalent foam height and foam volume, the foams produced using the foam formulation 10 utilized a slightly lower Isocyanate Index of about 280.

Figure 9:
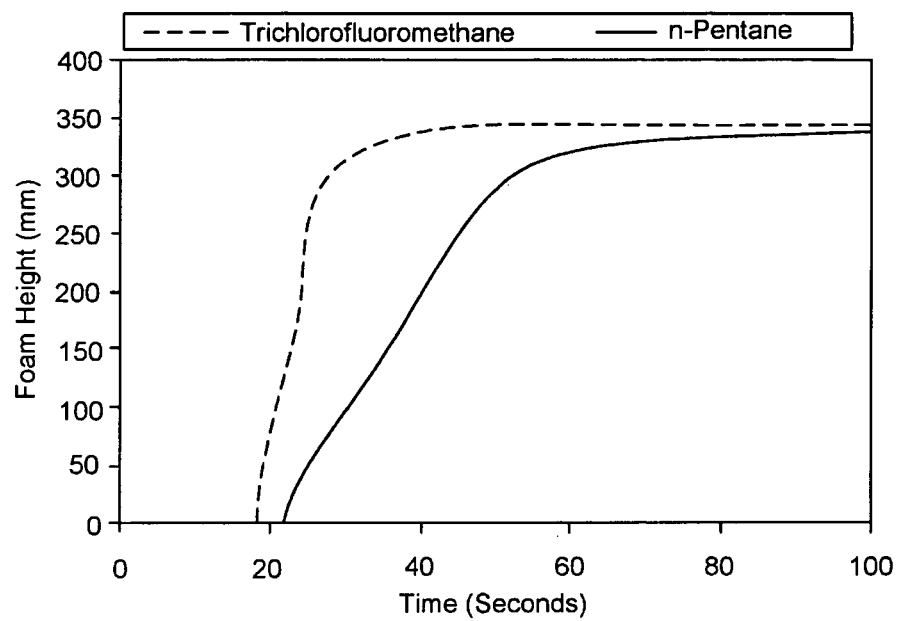
FIG. 9 presents a plot of the foam height versus time for foam formulations using trichlorofluoromethane and n-pentane blowing agents.

FIG. 9 compares the foam height versus time for comparative foam formulation 9—with the trichlorofluoromethane blowing agent—and inventive foam formulation 10, which used n-pentane as the blowing agent. As illustrated in FIG. 9, the trichlorofluoromethane blowing agent results in a much more rapid rise in the foam height as compared to the n-pentane.

The presence of two distinct peaks in FIG. 10 illustrates that the rate of rise speed of foam produced using the trichlorofluoromethane blowing agent is not constant. Foam is expanding at drastically different rates over time. This is particularly disadvantageous for continuous foam production lines, where the speed of the line cannot be adjusted to compensate for the drastic changes in the rate of the foam rise. In contrast, the foam produced using the n-pentane blowing agent provided a substantially uniform foam rise speed over a significant time period. This is illustrated in FIG. 10 with the substantially horizontal line at the constant foam rise rate of about 10 mm/sec over the time interval from about 25 to about 45 seconds. This combination of inventive catalyst 1 (a sterically hindered carboxylate salt, potassium pivalate) and a hydrocarbon blowing agent (n-pentane) provides a substantially consistent foam rise speed over a long time interval, a highly desirable feature for commercial PIR/PUR foam manufacturing operations.

Foam formulation 10 using the n-pentane blowing agent also included water and the Polycat® 5 catalyst (Table VI). A subsequent foaming test was performed to determine if these materials may have impacted the results illustrated in FIGS. 9 or 10. When water and the Polycat® 5 catalyst were removed, there was no significant change in the shape of the curves in FIGS. 9 and 10. The curves with the n-pentane blowing were merely shifted to the right slightly (i.e., an increase in the start time).

TABLE V

Composition of Comparative Foam Formulation 9

| COMPONENT | Weight Percent (%) |
|---|---|
| Polyester Polyol | 24 |
| TCPP | 6.3 |
| Surfactant | 1.0 |
| Trichlorofluoromethane | 12.6 |
| Catalyst 1 | 1.3 |
| MDI | 54 |

TABLE VI

Composition of Inventive Foam Formulation 10

| COMPONENT | Weight Percent (%) |
|---|---|
| Polyester Polyol | 30.1 |
| TCPP | 5 |
| Surfactant | 0.6 |
| Polycat ® 5 catalyst | 0.05 |
| n-Pentane | 12.6 |
| Water | 0.15 |
| Catalyst 1 | 0.9 |
| MDI | 55.2 |

The invention claimed is:

1. A method for preparing a polyisocyanurate/polyurethane foam which comprises contacting at least one polyisocyanate comprising at least one of toluene diisocyanate and diphenyl methane diisocyanate isomers, with at least one polyol at an Isocyanate Index of 150-650, in the presence of at least one blowing agent and an effective amount of a catalyst composition comprising a solution of at least one member selected from the group consisting of potassium pivalate, potassium triethylacetate and potassium neoheptanoate;
    with the proviso that the at least one blowing agent is not a chlorofluorocarbon.

2. The method of claim 1, wherein the catalyst composition is present in an amount from about 0.05 to about 10 parts by weight per hundred weight parts of the at least one polyol.

3. The method of claim 1 further comprising
    (a) forming a premix comprising:
        i) at least one polyol;
        ii) about 10 to about 80 parts by weight per hundred weight parts of the polyol (pphp) blowing agent;
        iii) about 0.5 to about 10 pphp silicone surfactant;
        iv) zero to about 10 pphp water;

v) zero to about 50 pphp flame retardant;
vi) zero to about 10 pphp urethane catalyst; and
vii) about 0.05 to about 10 pphp of the catalyst composition a; and
(b) contacting the premix with the polyisocyanate, the relative amounts of the components affording a foam having a density of 20-250 Kg/m$^3$ and wherein the foam has a substantially constant height rise versus time.

4. The method of claim 1, wherein the catalyst composition comprises potassium triethylacetate, potassium neoheptanoate, or any combination thereof.

5. The method of claim 1, wherein the catalyst composition comprises potassium pivalate.

6. The method of claim 1, wherein the at least one blowing agent comprises water, methylene chloride, acetone, a hydrocarbon, or any combination thereof.

7. The method of claim 6, wherein the at least one blowing agent comprises at least one hydrocarbon selected from the group consisting of n-pentane, iso-pentane, cyclopentane, or any combination thereof.

8. The method of claim 1, wherein the at least one polyol comprises at least one polyether polyol, at least one polyester polyol, or any combination thereof.

9. The method of claim 1, further comprising at least one alkali metal α,β-unsaturated carboxylate salt, at least one alkali metal carboxylate salt, at least one alkaline earth metal α,β-unsaturated carboxylate salt, at least one alkaline earth metal carboxylate salt, at least one quaternary ammonium α,β-unsaturated carboxylate salt, or at least one quaternary ammonium carboxylate salt, or any combination thereof.

10. The method of claim 1, wherein the catalyst composition is thermally stable at a temperature up to about 150° C.

11. The method of claim 1, wherein the catalyst composition is thermally stable at a temperature up to about 250° C.

12. The method of claim 1, wherein the catalyst composition further comprises a diluent.

13. The method of claim 12, wherein the diluents comprises ethylene glycol.

14. The method of claim 1 wherein the relative amounts of the components produce a foam having a density of 20-250 Kg/m$^3$.

15. The method of claim 6 wherein the blowing agent comprises water.

16. The method of claim 1 further comprising at least one member selected from the group consisting of surfactants, flame retardants, and urethane catalysts.

17. The method of claim 16 wherein said member comprises a urethane catalyst comprising at least one member selected from the group consisting of triethylenediamine, N-methylimidazole, 1,2-dimethyl-imidazole, N-methylmorpholine, N-ethylmorpholine, triethylamine, N,N'-dimethylpiperazine, 1,3,5-tris(dimethylaminopropyl)hexahydrotriazine, 2,4,6-tris(dimethylaminomethyl)phenol, N-methyldicyclohexylamine, pentamethyldipropylene triamine, N-methyl-N'-(2-dimethylamino)-ethyl-piperazine, tributylamine, pentamethyl-diethylenetriamine, hexamethyltriethylenetetramine, heptamethyltetraethylenepentamine, dimethylaminocyclohexyl-amine, pentamethyldipropylenetriamine, triethanolamine, dimethylethanolamine, bis(dimethylaminoethyl)ether, tris(3-dimethylamino)-propylamine, and 1,8-diazabicyclo[5.4.0]undecene or its acid blocked derivatives.

18. The method of claim 17 wherein said member comprises pentamethyl-diethylenetriamine.

19. The method of claim 1 further comprising at least one member selected from the group consisting of cell stabilizers, chain extenders, epoxy resins, acrylic resins, fillers and pigments.

20. The method of claim 16 wherein the flame retardant comprises trichloropropylphosphate.

21. The method of claim 7 wherein the blowing agent comprises n-pentane.

22. A method for preparing a polyisocyanurate/polyurethane foam which comprises contacting at least one polyisocyanate comprising at least one of toluene diisocyanate and diphenyl methane diisocyanate isomers, with at least one polyol at an Isocyanate Index of 150-650, in the presence of at least one blowing agent and an effective amount of a catalyst composition comprising a solution of at least one sterically hindered carboxylate salt having the formula:

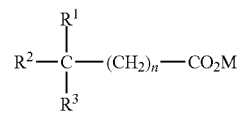

wherein:
R$^1$ R$^2$ and R$^3$ are selected independently from a C$_1$-C$_{18}$ alkyl, alkenyl, aryl, or aralkyl, any of which are substituted or unsubstituted;
n is an integer from 0 to 10, inclusive; and
M is potassium, with the proviso that the at least one blowing agent is not a chlorofluorocarbon; and wherein said catalyst composition further comprises at least one member selected from the group consisting of tetramethylammonium pivalate, 2-hydroxyl-propyltrimethylammonium pivalate, 2-hydroxylpropyltriethylammonium pivalate, tetraethylammonium pivalate, tetrapropylammonium pivalate, tetrabutylammonium pivalate, dimethyldiallylammonium pivalate, tetramethyl-ammonium triethylacetate, 2-hydroxylpropyltrimethylammonium triethylacetate, 2-hydroxylpropyltriethylammonium triethylacetate, tetraethylammonium triethylacetate, tetrapropylammonium triethylacetate, tetrabutylammonium triethylacetate, tetramethylammonium neoheptanoate, 2-hydroxylpropyltrimethyl-ammonium neoheptanoate, 2-hydroxylpropyltriethylammonium neoheptanoate, tetraethylammonium neoheptanoate, tetrapropylammonium neoheptanoate, tetrabutyl-ammonium neoheptanoate, tetramethylammonium neooctanoate, 2-hydroxylpropyltrimethylammonium neooctanoate, 2-hydroxylpropyl-triethylammonium neooctanoate, tetraethylammonium neooctanoate, tetrapropyl-ammonium neooctanoate, tetrabutylammonium neooctanoate, tetramethylammonium neodecanoate, 2-hydroxylpropyltrimethylammonium neodecanoate, 2-hydroxylpropyltriethylammonium neodecanoate, tetraethylammonium neodecanoate, tetrapropylammonium neodecanoate, tetrabutylammonium neodecanoate, or any combination thereof.

23. The method of claim 22, wherein R$^1$, R$^2$, and R$^3$ are selected independently from methyl, ethyl, propyl, butyl, pentyl, hexyl, heptyl, octyl, phenyl, tolyl, and benzyl.

24. The method of claim 22, wherein R$^1$, R$^2$, and R$^3$ are selected independently from methyl, ethyl, propyl, and butyl.

25. The method of claim 22, wherein the integer n can range from 0 to 5, inclusive.

26. The method of claim 22, wherein the at least one sterically hindered carboxylate salt comprises a salt of pivalic acid, triethylacetic acid, neohexanoic acid, neoheptanoic acid, neooctanoic acid, neodecanoic acid, neoundecanoic acid, neododecanoic acid, or any combination thereof.

27. The method of claim 22 wherein the member comprises tetramethylammonium pivalate.

\* \* \* \* \*